US012764180B2

(12) United States Patent
Srivastava et al.

(10) Patent No.: US 12,764,180 B2
(45) Date of Patent: Oct. 13, 2026

(54) SIZE-BASED DATA FILE PRIORITIZATION FOR DATA PACKAGE TRANSFERS

(71) Applicant: Dell Products L.P., Round Rock, TX (US)

(72) Inventors: Rajendra Prasad Srivastava, Hyderabad (IN); Amit Pandit Rajapurkar, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/794,559

(22) Filed: Aug. 5, 2024

(65) Prior Publication Data

US 2026/0039710 A1 Feb. 5, 2026

(51) Int. Cl.
*H04L 67/06* (2022.01)
*G06F 9/48* (2006.01)

(52) U.S. Cl.
CPC ............ *H04L 67/06* (2013.01); *G06F 9/4881* (2013.01)

(58) Field of Classification Search
CPC ............................... H04L 67/06; G06F 9/4881
See application file for complete search history.

(56) References Cited

U.S. PATENT DOCUMENTS 9,892,124 B2 * 2/2018 Zhou ....................... G06F 16/13
11,726,789 B1 * 8/2023 Fischer ............... G06F 9/30123 712/216
2012/0254485 A1 * 10/2012 Tamura ................... G06F 9/544 710/56
2014/0250158 A1 * 9/2014 Tang ....................... H04L 67/06 707/827
2014/0324928 A1 * 10/2014 Tinker .................. G06F 16/183 707/827

(Continued)

FOREIGN PATENT DOCUMENTS

CN 111901377 A * 11/2020 ........... H04L 67/568

OTHER PUBLICATIONS

"Working with Transfer Packages"; https://www.ibm.com/docs/en/rational-synergy/7.2.1?topic=dcm-working-transfer-packages; Mar. 5, 2021.

(Continued)

*Primary Examiner* — Benjamin M Thieu
(74) *Attorney, Agent, or Firm* — Ryan, Mason & Lewis, LLP

(57) ABSTRACT

Techniques are provided for data file prioritization for data package transfers based on a size of the data files. One method includes obtaining a data package to be transferred, wherein the data package comprises multiple data files; obtaining respective sizes of the multiple data files in the obtained data package; determining a number of transfer threads for transferring the multiple data files in the obtained data package; assigning the multiple data files to the determined number of transfer threads based on the respective sizes of the multiple data files; and transferring the multiple data files using the assigned transfer threads. The largest data files of the multiple data files may be assigned to the determined number of transfer threads. When a transfer of a given data file on a given transfer thread completes, a largest remaining data file may be assigned to the given transfer thread.

20 Claims, 7 Drawing Sheets

(56) References Cited

U.S. PATENT DOCUMENTS

| | | | | |
|---|---|---|---|---|
| 2015/0302016 | A1 * | 10/2015 | Nam | G06F 16/119 707/609 |
| 2016/0246538 | A1 * | 8/2016 | Vazhenin | G06F 12/1408 |
| 2020/0019535 | A1 * | 1/2020 | Parker | G06F 16/16 |
| 2020/0084264 | A1 * | 3/2020 | Staubly | G06F 9/54 |
| 2020/0320035 | A1 * | 10/2020 | Javeed | G06N 3/006 |
| 2020/0404044 | A1 * | 12/2020 | Dey | H04L 67/141 |
| 2021/0096759 | A1 * | 4/2021 | Thakkilapati | G06F 3/0646 |
| 2022/0237084 | A1 * | 7/2022 | Bhagi | G06F 11/2097 |
| 2022/0283798 | A1 * | 9/2022 | Yamashita | G06F 21/577 |
| 2022/0283986 | A1 * | 9/2022 | Kandula | G06F 16/122 |

OTHER PUBLICATIONS

"Secure File Transfer (SFT)"; https://www.myexostar.com/?ht_kb=secure-file-transfer-sft; downloaded on Jul. 19, 2024.

"File Transfer"; https://help.msp360.com/cloudberry-remote-desktop/using-remote-desktop/file-transfer; downloaded on Jul. 19, 2024.

* cited by examiner

SIZE-BASED DATA FILE PRIORITIZATION FOR DATA PACKAGE TRANSFERS

BACKGROUND

Data transfer efficiency is important for businesses that handle a large volume of data files. Data file-level optimization techniques, for example, have significantly improved individual data file transfers. Nonetheless, a need remains for techniques for improving the transfer of data packages comprised of multiple data files.

SUMMARY

Illustrative embodiments of the disclosure provide techniques for prioritization of data files for data package transfers based on a size of the data files. One method includes obtaining a data package to be transferred from a first processing device to a second processing device, wherein the data package comprises a plurality of data files; obtaining respective sizes of the plurality of data files in the obtained data package; determining a number of transfer threads for transferring the plurality of data files in the obtained data package; assigning respective ones of the plurality of data files to the determined number of transfer threads based at least in part on the respective sizes of the plurality of data files; and transferring the respective ones of the plurality of data files using the assigned transfer threads.

Illustrative embodiments can provide significant advantages relative to conventional data package transfer techniques. For example, technical problems related to such conventional data package transfer techniques are mitigated in one or more embodiments by implementing size-based data file prioritization and transfer techniques that automatically assign data files of a given data package to transfer threads based on a size of the data files in the given data package to be transferred.

These and other illustrative embodiments described herein include, without limitation, methods, apparatus, systems, and computer program products comprising processor-readable storage media.

DETAILED DESCRIPTION

Figure 1:
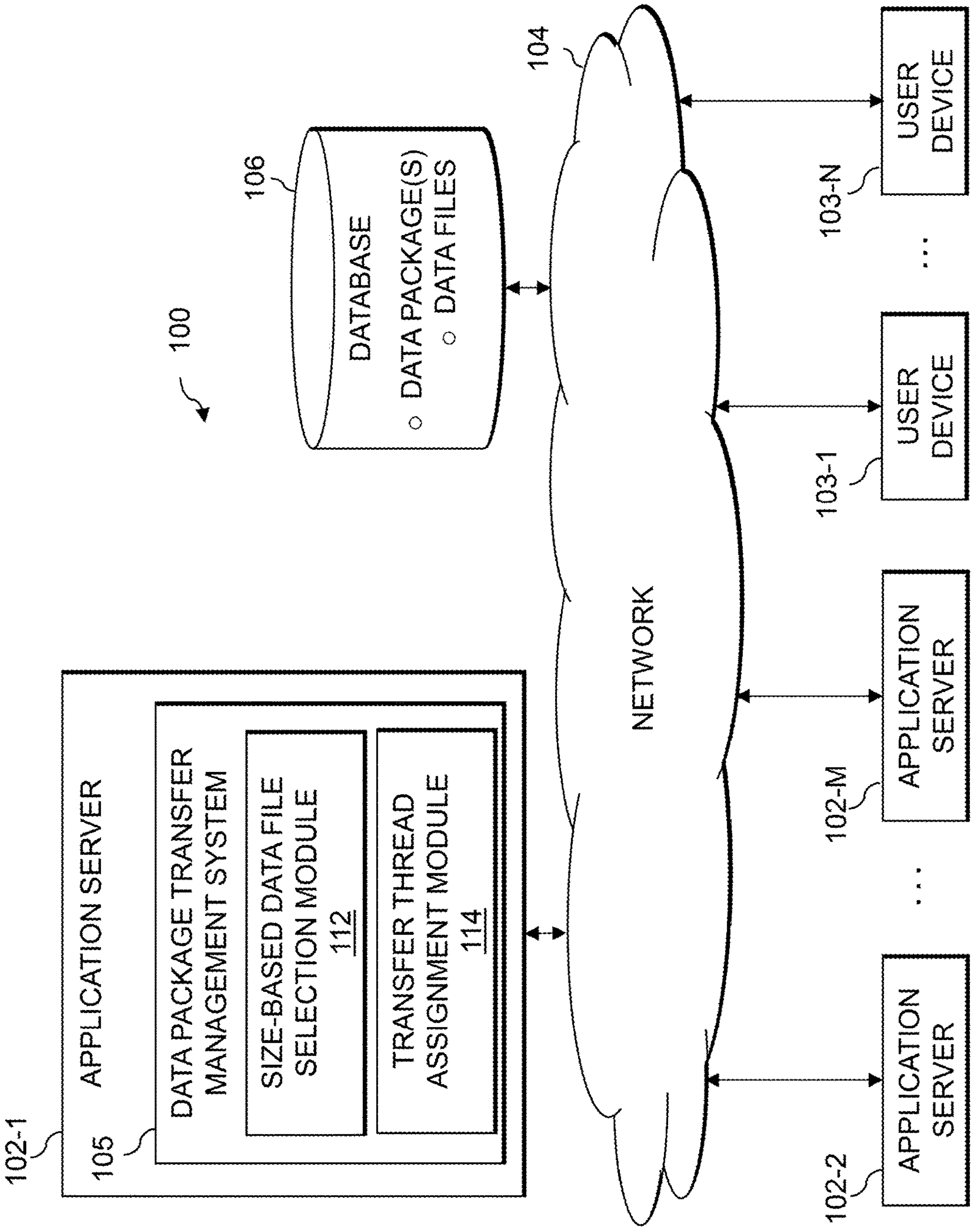
FIG. 1 illustrates a network computing environment that can be configured for size-based data file prioritization for data package transfers in accordance with an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

In one or more embodiments, size-based data file prioritization techniques are provided that improve the transfer of data packages comprised of multiple data files. For example, in an image engineering process, engineers download and upload images of virtual resources from vendors to perform engineering operations. Thereafter, the updated image file is bundled into a data package with additional files for further processing. A data package can typically be used only if all of the intended data files of the data package are available for processing. The unavailability of even a single data file in a given data package can lead to a failure of the image fulfillment process.

Existing data package transfer techniques employ a random file selection method that aims to optimize bandwidth and input/output (I/O) requirements (e.g., often resulting in critical files being transferred later than less important ones and delaying the commencement of work on a project). The random data file selection method often fails to consider the interconnected nature, for example, of the multiple data files within a data package.

In addition, existing data package transfer techniques often initiate the transfer of data files from multiple projects at the same time, often resulting in an allocation of data files across different projects. Thus, engineers may wait longer to receive a complete set of data files for a single project, impeding their workflow. Frequently, these data packages are transferred concurrently, leading to significant bottlenecks in an engineering process. The resulting delays are not trivial (e.g., ranging from several hours to an entire day), often jeopardizing the satisfaction of customer-imposed deadlines or customer Service Level Agreements (SLAs).

One or more aspects of the disclosure recognize that existing data file transfer systems often lack an efficient algorithm for data file selection, typically relying on a random order or an alphabetical order. The lack of an efficient data file transfer system may disrupt the overall workflow of one or more projects. In one or more embodiments, techniques are provided for data file prioritization for data package transfer based on file size. The disclosed size-based data file prioritization techniques comprise a data file selection algorithm that prioritizes larger data files within each data package, ensuring that larger, more time-consuming data files are transferred first, improving (e.g., optimizing) the use of allocated transfer threads. In this manner, the overall completion time of a data package transfer is significantly reduced, especially in environments with limited thread availability. In at least some embodiments, the largest data files, which generally consume more transfer time, are processed first, thereby reducing the waiting time for subsequent smaller data files and providing a more efficient utilization of each transfer thread.

The disclosed techniques for prioritizing data files for a data package transfer based on file size, in at least some embodiments, enhance the speed and efficiency of transferring one or more data packages comprised of multiple data files as cohesive units. The size-based data file prioritization techniques may employ a data package-level optimization that selects and prioritizes data files within a data package, ensuring that the entire data package is transferred in as little time as possible. Among other benefits, the disclosed size-based data file prioritization techniques reduce the transfer time for a given data package and improve the overall operational efficiency. By focusing on each data package as a unit rather than individual data files, the size-based data file prioritization techniques improve the transfer process, especially under conditions where multiple data packages are being transferred concurrently (thereby improving the efficiency of bandwidth and/or I/O resource utilization and aligning with the operational needs and deadlines set by customers, for example).

FIG. 1 shows a computer network (also referred to herein as an information processing system) 100 configured in accordance with an illustrative embodiment. The computer network 100 comprises a plurality of application servers 102-1, 102-2, . . . 102-M, collectively referred to herein as application servers 102 and plurality of user devices 103-1, . . . 103-N, collectively referred to herein as application servers 102 and user devices 103, respectively. The application servers 102 and user devices 103 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment.

The application servers 102 may comprise, for example, application servers, database servers and/or portions of one or more server systems. Such devices are examples of what are more generally referred to herein as "processing devices." Some of these processing devices are also generally referred to herein as "computers." The application servers 102 and/or database servers may be implemented using virtual and/or physical machines. The application servers 102 in some embodiments comprise respective servers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The user devices 103 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 103 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the application servers 102 can have at least one associated database 106 configured to store data pertaining to, for example, data packages to be transferred and the data files of the data packages to be transferred. An example database 106, such as depicted in the present embodiment, can be implemented using one or more storage systems associated with the one or more application servers 102. Such storage systems can comprise any of a variety of different types of storage including network-attached storage (NAS), storage area networks (SANs), direct-attached storage (DAS) and distributed DAS, as well as combinations of these and other storage types, including software-defined storage.

In the example of FIG. 1, application server 102-1 comprises a data package transfer management system 105 that is also coupled to network 104. The data package transfer management system 105 comprises a size-based data file selection module 112 and a transfer thread assignment module 114. In at least some embodiments, the size-based data file selection module 112 evaluates a size of each of the multiple data files in a data package to be transferred and prioritizes the data files based on the file size, as discussed further below in conjunction with FIG. 2, for example. The transfer thread assignment module 114 assigns the data files of a data package to transfer threads using the size-based prioritization determined by the size-based data file selection module 112, as discussed further below in conjunction with FIG. 2, for example.

Also associated with the one or more application servers 102 are one or more input-output devices, which illustratively comprise keyboards, displays or other types of input-output devices in any combination. Such input-output devices can be used, for example, to support one or more user interfaces to the one or more application servers 102 and/or the data package transfer management system 105, as well as to support communication between the one or more application servers 102 and/or the data package transfer management system 105 and other related systems and devices not explicitly shown.

Additionally, the one or more application servers 102 in the FIG. 1 embodiment are each assumed to be implemented using at least one processing device. Each such processing device generally comprises at least one processor and an associated memory, and implements one or more functional modules for controlling certain features of the one or more application servers 102 and/or the data package transfer management system 105.

More particularly, the one or more application servers 102 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow communication between the one or more application servers 102 and the data package transfer management system 105, and each illustratively comprises one or more conventional transceivers.

One or more aspects of the disclosure recognize that servers, such as virtual machine-based application servers and/or database servers, often need to be updated for a variety of reasons, such as to address security concerns related to an operating system, to mitigate one or more software bugs and/or to ensure that the servers comply with standards and/or compliance metrics of an organization.

In at least some embodiments, the size-based data file prioritization and transfer techniques implemented by the application server 102-1 transfer data files between the application server 102-1 and at least one other application server 102 (e.g., the data file transfers are between two servers). In other words, a given application server 102 can be a client that receives a data package comprised of multiple data files. One or more of the application servers 102 may be configured by one or more of the user devices 103.

It is to be appreciated that the particular arrangement of elements 112 and 114 illustrated in the data package transfer management system 105 of the FIG. 1 embodiment is presented by way of example only, and alternative arrangements can be used in other embodiments. For example, the functionality associated with the elements 112 and 114 in other embodiments can be combined into a single element, or separated across a larger number of elements. As another example, multiple distinct processors can be used to implement different ones of the elements 112 and 114 or portions thereof.

At least portions of elements 112 and 114 may be implemented at least in part in the form of software that is stored in memory and executed by a processor. One or more of the application servers 102-2 through 102-M may be configured in a similar manner as application server 102-1, as would be apparent to a person of ordinary skill in the art.

It is to be understood that the particular set of elements shown in FIG. 1 for the one or more data package transfer management systems 105 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the one or more application servers 102 and databases 106 can be on and/or part of the same processing platform.

An exemplary process utilizing elements 112 and 114 of an example data package transfer management system 105 in application server 102-1 will be described in more detail with reference to, for example, the flow diagram of FIG. 2.

Figure 2:
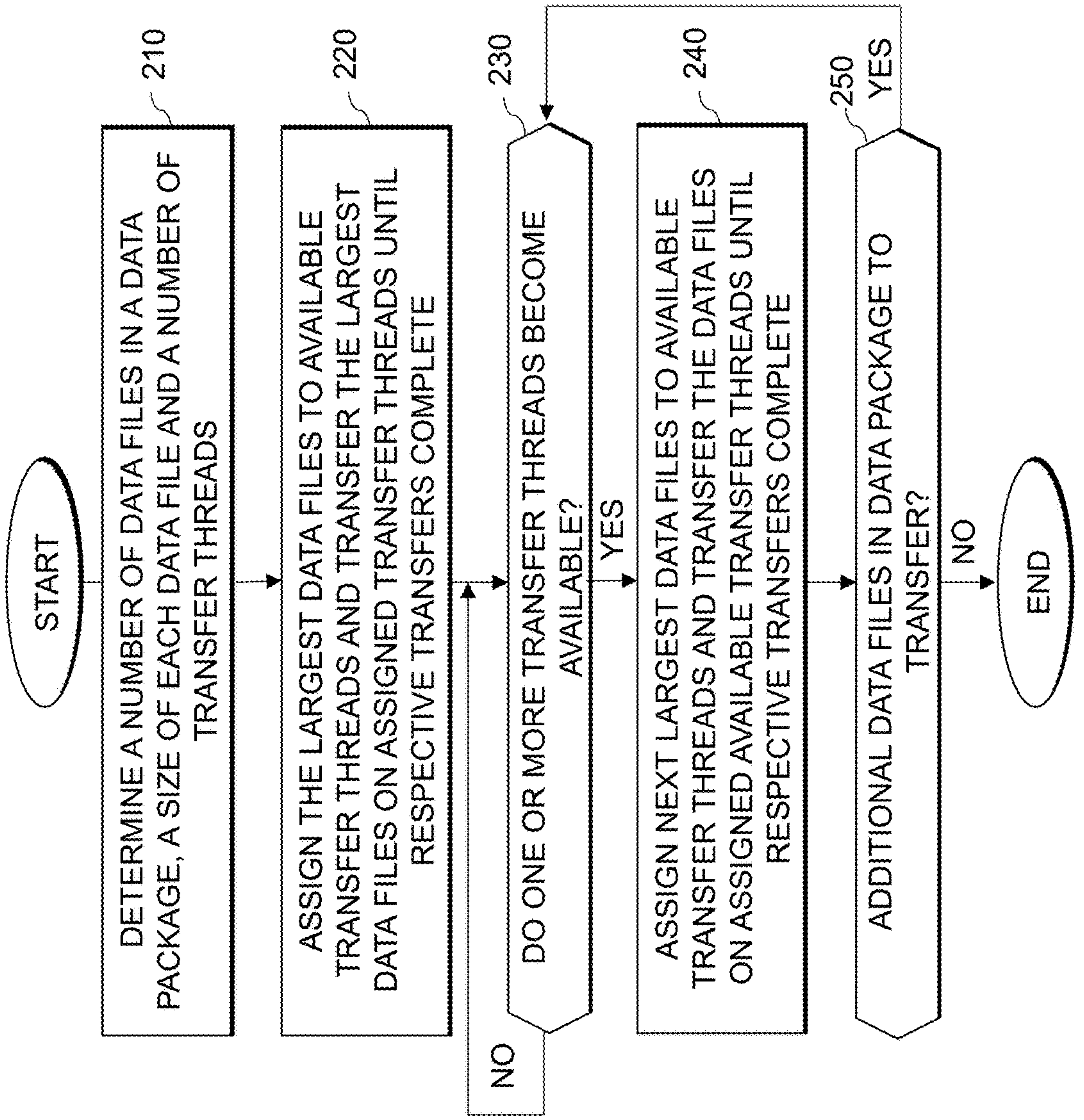
FIG. 2 is a flow diagram illustrating an exemplary implementation of a size-based data file prioritization and transfer process in accordance with an illustrative embodiment.

FIG. 2 is a flow diagram illustrating an exemplary implementation of a size-based data file prioritization and transfer process in accordance with an illustrative embodiment. The size-based data file prioritization and transfer process may be performed, for example, by the data package transfer management system 105 in application server 102-1 of FIG. 1. In the example of FIG. 2, a number of data files in a data package, a size of each data file and a number of transfer threads are determined in step 210. In at least some implementations, the number of data files is greater than the number of transfer threads.

The largest data files are assigned in step 220 to the available transfer threads and the largest data files are transferred on the assigned transfer threads until the respective transfers complete. Step 220 may be performed at least in part by the size-based data file selection module 112 and/or the transfer thread assignment module 114 of the data package transfer management system 105 in application server 102-1 of FIG. 1. In one or more embodiments, once a given transfer thread is assigned to transfer a given data file, the given transfer thread transfers the given data file until the transfer has finished (e.g., and then the transfer thread becomes available to transfer the next largest available data file).

Once it is determined in step 230 that one or more transfer threads become available (e.g., after completing the transfer of the assigned data file), then the next largest data files are assigned to the available transfer threads and the data files are transferred on the assigned available transfer threads in step 240 until the respective transfers complete. Step 240 may be performed at least in part by the size-based data file selection module 112 and/or the transfer thread assignment module 114 of the data package transfer management system 105 in application server 102-1 of FIG. 1.

A further test is performed in step 250 to determine if there are additional data files in the data package to transfer. If it is determined in step 250 that there are one or more additional data files in the data package to transfer, then program control returns to step 230 to transfer the additional data files, in the manner described above.

If, however, it is determined in step 250 that there are no additional data files in the data package to transfer then program control ends.

Figure 3:
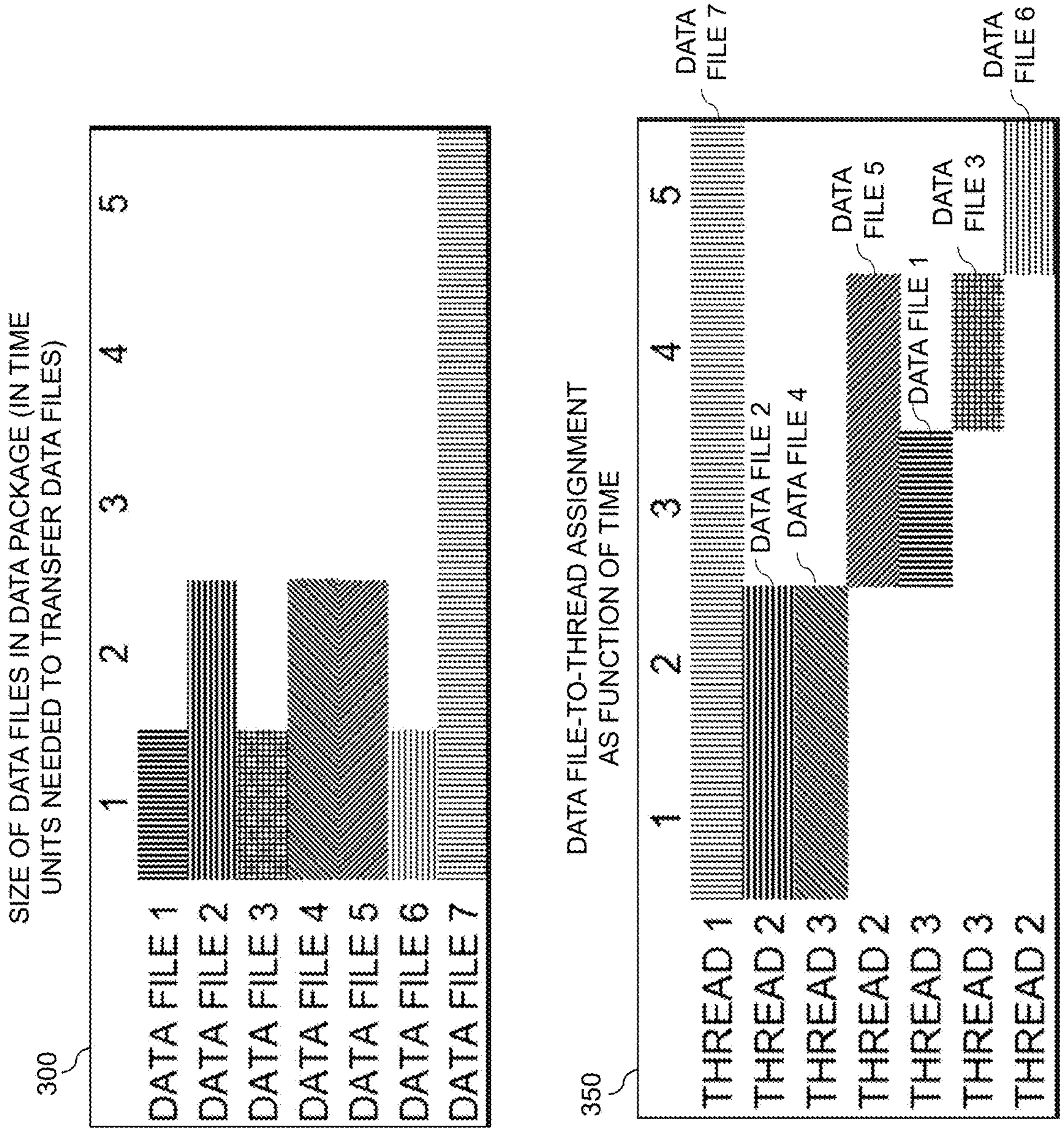
FIGS. 3 and 4 comprise sample tables illustrating exemplary data packages having multiple data files being assigned to threads using the size-based data file prioritization for data package transfers techniques in accordance with an illustrative embodiment.

FIG. 3 comprises sample tables illustrating an exemplary data package having multiple data files being assigned to transfer threads using the disclosed size-based data file prioritization for data package transfers in accordance with an illustrative embodiment. A first table 300 illustrates a size of multiple data files in a data package to be transferred. Each column in the first table 300 represents an amount of time that each data file takes to be fully transferred. A second table 350 illustrates a data file-to-thread assignment as a function of time.

In the example of FIG. 3, the data package comprises seven data files (data files 1-7), each represented by a different hash pattern. In addition, three threads are available to transfer the data package. The largest data file (data file 7) is assigned to thread 1, the second largest data file (data file 2) is assigned to thread 2 and the third largest data file (data file 4) is assigned to thread 3. Threads 2 and 3 complete after two units of time and are available to transfer the next largest data files. Thus, in time slots 3 and 4, thread 2 begins to transfer data file 5 and, in time slot 3, thread 3 transfers data file 1. The transfer of data file 1 on thread 3 completes after one time unit and thread 3 becomes available to transfer data file 3 in time slot 4. Finally, thread 2 becomes available in time slot 5 and transfers data file 6 within one time unit, while the transfer of data file 7 also completes after time slot 5.

It can be shown that a transfer of the data package using conventional techniques (e.g., selecting and transferring the data files sequentially, regardless of file size) would take approximately eight (8) time units, while the data package transfer using the disclosed size-based data file prioritization techniques (that prioritize the largest data files first) completes in just five (5) time units.

Figure 4:
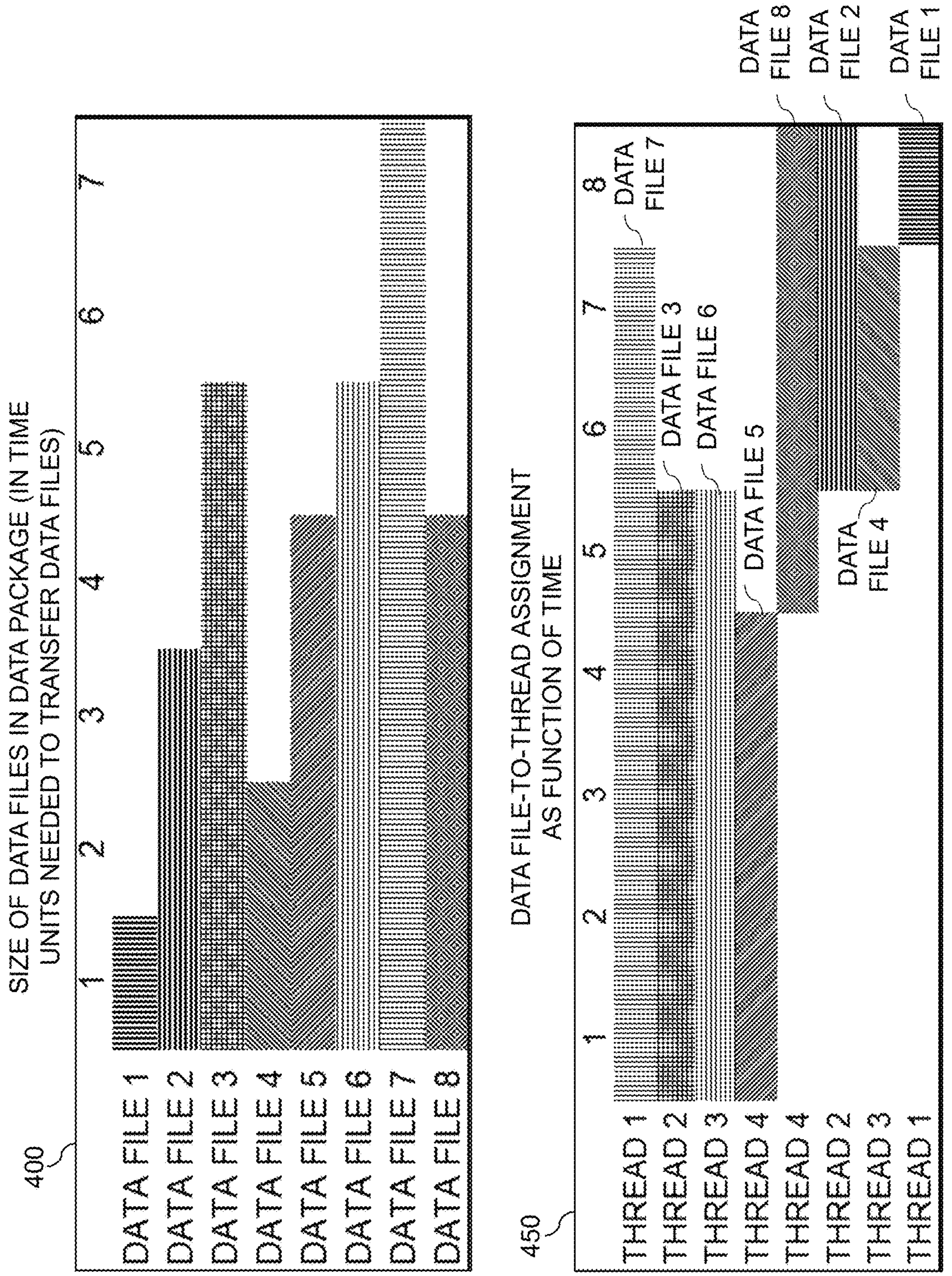

FIG. 4 comprises sample tables illustrating an exemplary data package having multiple data files being assigned to threads using the size-based data file prioritization for data package transfers techniques in accordance with an illustrative embodiment. A first table 400 illustrates a size of multiple data files in a data package to be transferred. Each column in the first table 400 represents an amount of time that each data file takes to be fully transferred. A second table 450 illustrates a data file-to-thread assignment as a function of time.

In the example of FIG. 4, the data package comprises eight data files (data files 1-8), each represented by a different hash pattern. In addition, four threads are available to transfer the data package. The largest data file (data file 7) is assigned to thread 1, the second largest data file (data file 3) is assigned to thread 2, the third largest data file (data file 6) is assigned to thread 3 and the fourth largest data file (data file 5) is assigned to thread 4. Thread 4 completes after four units of time and becomes available to transfer the next largest data file. Thus, in time slots 5 through 8, thread 4 transfers data file 8. In time slot 6, threads 2 and 3 become available and are assigned to transfer data files 2 and 4, respectively. Thread 1 becomes available to transfer data file 1 in time slot 8.

It can be shown that a transfer of the data package using the disclosed size-based data file prioritization techniques (that prioritize the largest data files first) will reduce the overall transfer time by twenty percent (20%) relative to conventional techniques (e.g., selecting and transferring the data files sequentially, regardless of file size).

Figure 5:
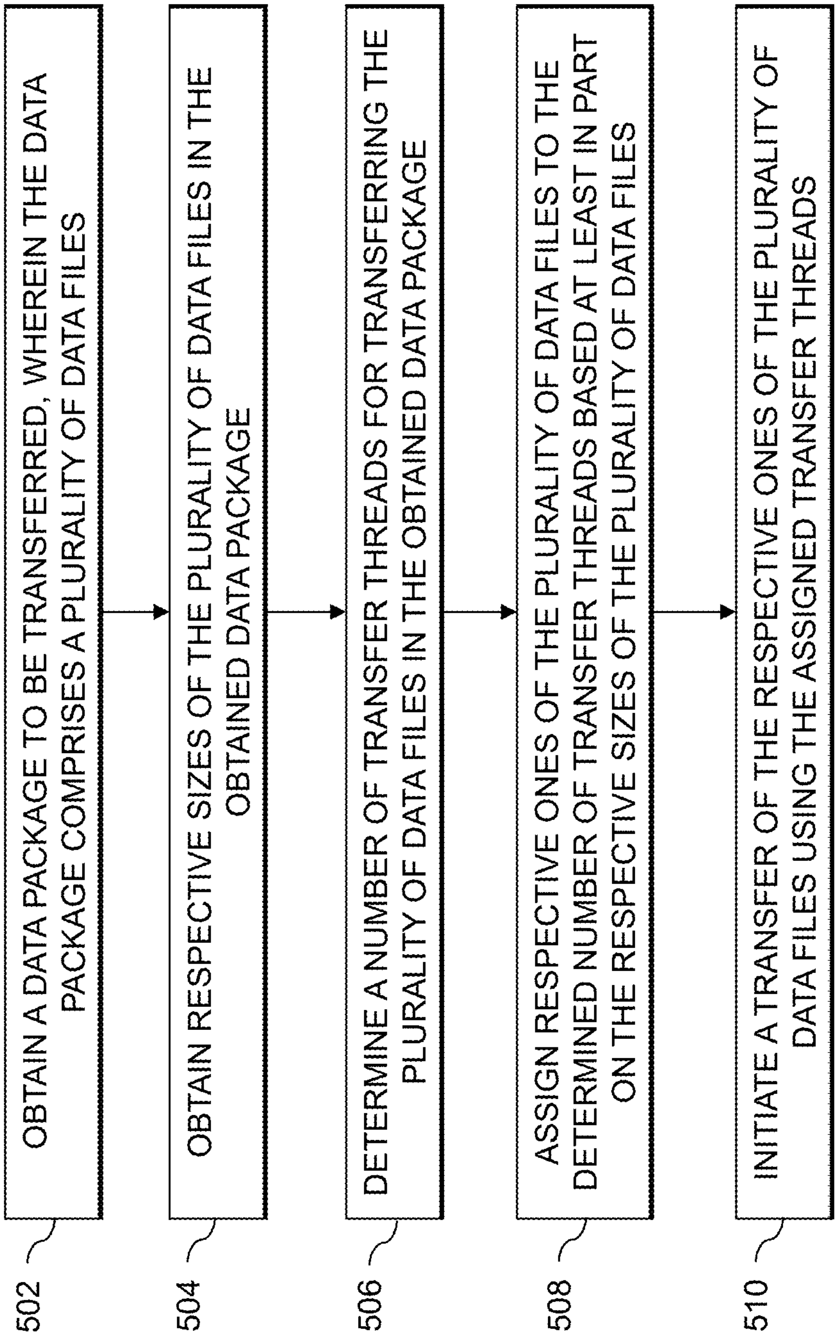
FIG. 5 is a flow diagram illustrating an exemplary implementation of a method for data file prioritization for data package transfers based on file size, according to one or more embodiments of the disclosure.

FIG. 5 is a flow diagram illustrating an exemplary implementation of a method for data file prioritization for data package transfers based on file size, according to one or more embodiments of the disclosure. In the example of FIG. 5, a data package to be transferred is obtained in step 502, where the data package comprises a plurality of data files.

In step 504, respective sizes of the plurality of data files in the obtained data package are obtained. A number of transfer threads for transferring the plurality of data files in the obtained data package is determined in step 506. For example, the number of transfer threads may be determined using static techniques and/or may be configured by a user, for example, based on available server resources and/or available bandwidth. As used herein, the term "transfer thread" (or "thread") shall be broadly construed to encompass any communication path for transferring data files, such as a point-to-point path, between at least one source device and at least one destination device, such as at least a portion of at least one source processing device, at least a portion of at least one destination processing device and one or more communication links between the at least one source processing device and the at least one destination processing device. Thus, a transfer thread for transferring data files comprises computer elements and/or network elements (including portions thereof), as would be apparent to a person of ordinary skill in the art.

In step 508, respective ones of the plurality of data files are assigned to the determined number of transfer threads based at least in part on the respective sizes of the plurality of data files. A transfer of the respective ones of the plurality of data files is initiated in step 510 using the assigned transfer threads.

In one or more embodiments, the assigning the respective ones of the plurality of data files comprises assigning the largest data files of the plurality of data files to the determined number of transfer threads. The transferring of a given one of the plurality of data files on a given assigned transfer thread may continue until the transfer of the given data file completes. In response to a completion of the transfer of the given data file on the given assigned transfer thread, a largest data file of one or more remaining data files to be transferred, of the plurality of data files, may be assigned to the given assigned transfer thread.

In some embodiments, an availability of the determined number of transfer threads may be monitored and, in response to a given transfer thread becoming available, a largest data file, of one or more remaining data files to be transferred, of the plurality of data files, may be assigned to the given transfer thread. The number of transfer threads for transferring the plurality of data files may be constrained.

In at least one embodiment, a plurality of data packages may be transferred in parallel using respective independent sets of transfer threads. For example, the same threads may be used for a given data package until the transfer of the entire given data package completes, and then the threads may then be released to handle other data packages.

The particular processing operations and other network functionality described in conjunction with the flow diagrams of FIGS. 2 and 5, for example, are presented by way of illustrative example only and should not be construed as limiting the scope of the disclosure in any way. Alternative embodiments can use other types of processing operations for data file prioritization for data package transfers based on file size. For example, the ordering of the process steps may be varied in other embodiments, or certain steps may be performed concurrently with one another rather than serially. In one aspect, the process can skip one or more of the steps. In other aspects, one or more of the steps are performed simultaneously. The processing of one or more of the steps can also be distributed between multiple components. In some aspects, additional steps can be performed.

In some embodiments, techniques are provided for data file prioritization for data package transfers based on file size. In at least some embodiments, the disclosed size-based data file prioritization and transfer techniques reduce the time to transfer a complete data package comprised of multiple data files, such as image data files. Data files within the data package are prioritized for transfer based on the size of each data file, with the largest data files being transferred first on the available transfer threads. In this manner, a more efficient and consistent use of the transfer threads is observed, avoiding underutilization and delays typically associated with conventional data file transfer methods. In addition, the disclosed size-based data file prioritization and transfer techniques improve the productivity of engineers and other workers by ensuring quicker access to the full set of data files of a data package, thereby streamlining project workflows.

One or more embodiments of the disclosure provide improved methods, apparatus and computer program products for data file prioritization for data package transfers based on file size. The foregoing applications and associated embodiments should be considered as illustrative only, and numerous other embodiments can be configured using the techniques disclosed herein, in a wide variety of different applications.

It should also be understood that the disclosed size-based data file prioritization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data file prioritization for data package transfers based on file size may be implemented using one or more processing platforms. The size-based data file prioritization techniques significantly reduce the total time required to transfer a complete data package (crucial, for example, in environments where timely project completion is important) and thereby ensure quicker access to larger and more critical data files, streamlining project workflows. One or more of the processing modules or other components may therefore each execute on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that executes on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data file prioritization processing engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based data file prioritization processing platform in illustrative embodiments. The cloud-based systems can include block storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may execute on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
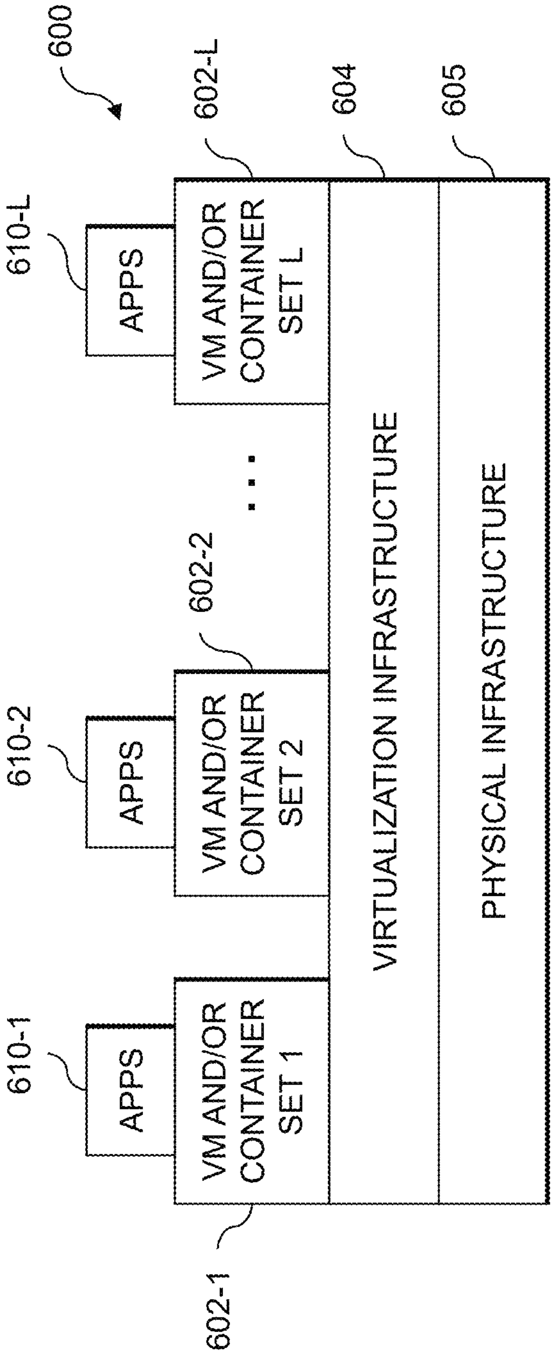
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of an information processing system. The cloud infrastructure 600 comprises multiple virtual machines (VMs) and/or container sets 602-1, 602-2, . . . 602-L implemented using virtualization infrastructure 604. The virtualization infrastructure 604 executes on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide size-based data file prioritization functionality of the type described above for one or more processes running on a given one of the VMs. For example, each of the VMs can implement size-based data file prioritization control logic and associated functionality for transferring data files assigned to threads.

An example of a hypervisor platform that may be used to implement a hypervisor within the virtualization infrastructure 604 is a compute virtualization platform which may have an associated virtual infrastructure management system such as server management software. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide size-based data file prioritization functionality of the type described above for one or more processes running on different ones of the containers. For example, a container host device supporting multiple containers of one or more container sets can implement one or more instances of size-based data file prioritization control logic and associated functionality for transferring data files assigned to threads.

As is apparent from the above, one or more of the processing modules or other components of the information processing system may each execute on a computer, server, storage device or other processing platform element. A given such element may be viewed as an example of what is more generally referred to herein as a processing device. The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
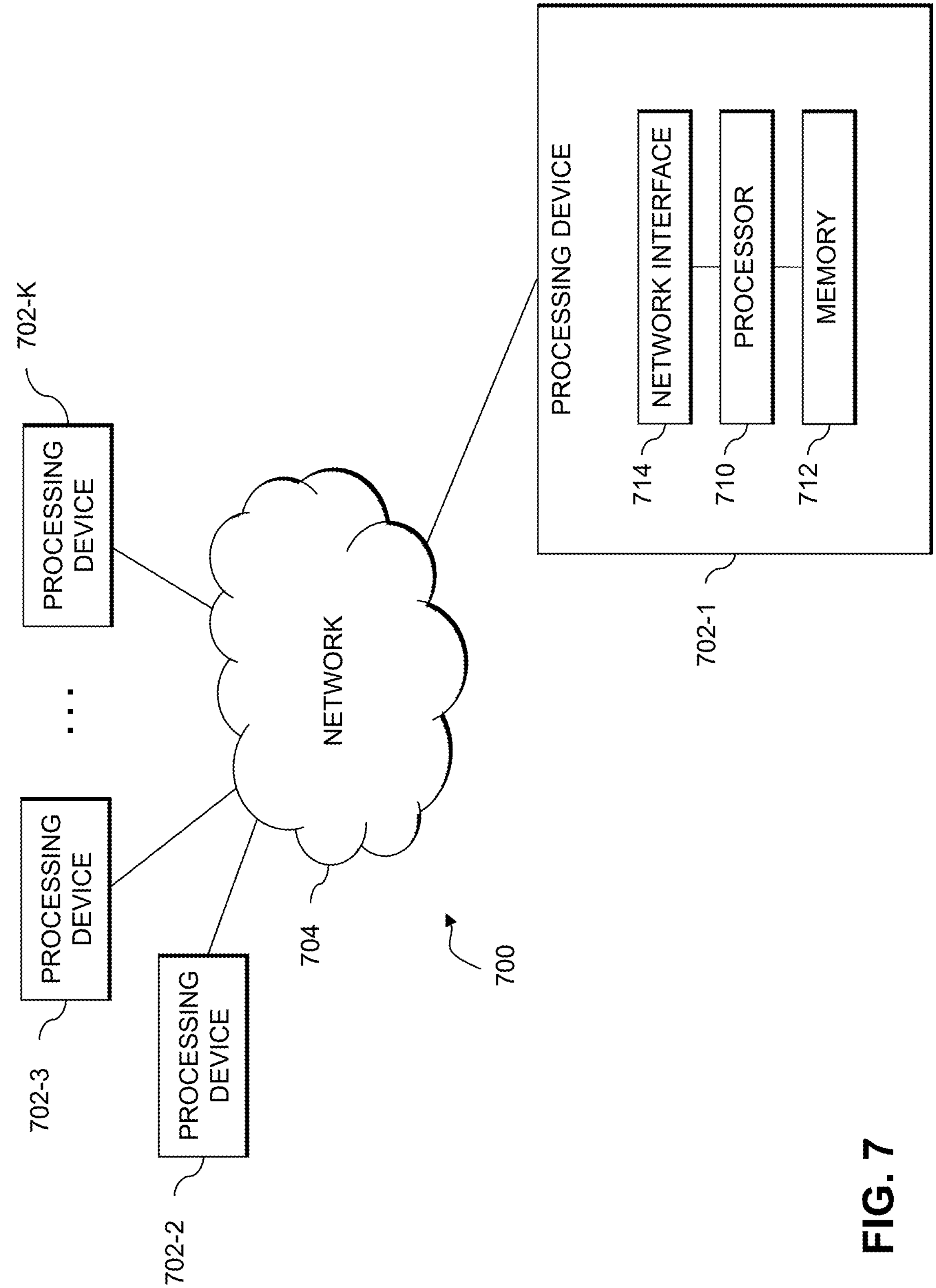
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a data package to be transferred, wherein the data package comprises a plurality of data files;

obtaining respective sizes of the plurality of data files in the obtained data package;

determining a number of transfer threads for transferring the plurality of data files in the obtained data package;

assigning respective ones of the plurality of data files to the determined number of transfer threads in an order based at least in part on the respective sizes of the plurality of data files;

initiating a transfer of the respective ones of the plurality of data files using the assigned transfer threads; and monitoring an availability of the determined number of transfer threads and, in response to a particular transfer thread becoming available, assigning a largest data file, of one or more remaining data files to be transferred, of the plurality of data files, to the particular transfer thread;

wherein the method is performed by at least one processing device comprising a processor coupled to a memory.

2. The method of claim 1, wherein the assigning the respective ones of the plurality of data files comprises assigning the largest data files of the plurality of data files to the determined number of transfer threads.

3. The method of claim 1, wherein the transferring of a given one of the plurality of data files on a given assigned transfer thread continues until the transfer of the given data file completes.

4. The method of claim 3, wherein, in response to a completion of the transfer of the given data file on the given assigned transfer thread, assigning a largest data file of one or more remaining data files to be transferred, of the plurality of data files, to the given assigned transfer thread.

5. The method of claim 1, wherein the number of transfer threads for transferring the plurality of data files is constrained.

6. The method of claim 1, wherein a plurality of data packages is transferred in parallel using respective independent sets of transfer threads.

7. The method of claim 1, wherein the transferring of the assigned largest data file on the particular assigned transfer thread continues until the transfer of the assigned largest data file completes.

8. An apparatus comprising:

at least one processing device comprising a processor coupled to a memory;

obtaining a data package to be transferred, wherein the data package comprises a plurality of data files;

obtaining respective sizes of the plurality of data files in the obtained data package;

determining a number of transfer threads for transferring the plurality of data files in the obtained data package;

assigning respective ones of the plurality of data files to the determined number of transfer threads in an order based at least in part on the respective sizes of the plurality of data files;

initiating a transfer of the respective ones of the plurality of data files using the assigned transfer threads; and monitoring an availability of the determined number of transfer threads and, in response to a particular transfer thread becoming available, assigning a largest data file, of one or more remaining data files to be transferred, of the plurality of data files, to the particular transfer thread.

9. The apparatus of claim 8, wherein the assigning the respective ones of the plurality of data files comprises assigning the largest data files of the plurality of data files to the determined number of transfer threads.

10. The apparatus of claim 8, wherein the transferring of a given one of the plurality of data files on a given assigned transfer thread continues until the transfer of the given data file completes.

11. The apparatus of claim 10, wherein, in response to a completion of the transfer of the given data file on the given assigned transfer thread, assigning a largest data file of one or more remaining data files to be transferred, of the plurality of data files, to the given assigned transfer thread.

12. The apparatus of claim 8, wherein the number of transfer threads for transferring the plurality of data files is constrained.

13. The apparatus of claim 8, wherein a plurality of data packages is transferred in parallel using respective independent sets of transfer threads.

14. The apparatus of claim 8, wherein the transferring of the assigned largest data file on the particular assigned transfer thread continues until the transfer of the assigned largest data file completes.

15. A non-transitory processor-readable storage medium having stored therein program code of one or more software programs, wherein the program code when executed by at least one processing device causes the at least one processing device to perform the following steps:

obtaining a data package to be transferred, wherein the data package comprises a plurality of data files;

obtaining respective sizes of the plurality of data files in the obtained data package;

determining a number of transfer threads for transferring the plurality of data files in the obtained data package;

assigning respective ones of the plurality of data files to the determined number of transfer threads in an order based at least in part on the respective sizes of the plurality of data files;

initiating a transfer of the respective ones of the plurality of data files using the assigned transfer threads; and monitoring an availability of the determined number of transfer threads and, in response to a particular transfer thread becoming available, assigning a largest data file, of one or more remaining data files to be transferred, of the plurality of data files, to the particular transfer thread.

16. The non-transitory processor-readable storage medium of claim 15, wherein the assigning the respective ones of the plurality of data files comprises assigning the largest data files of the plurality of data files to the determined number of transfer threads.

17. The non-transitory processor-readable storage medium of claim 15, wherein the transferring of a given one of the plurality of data files on a given assigned transfer thread continues until the transfer of the given data file completes.

18. The non-transitory processor-readable storage medium of claim 17, wherein, in response to a completion of the transfer of the given data file on the given assigned transfer thread, assigning a largest data file of one or more remaining data files to be transferred, of the plurality of data files, to the given assigned transfer thread.

19. The non-transitory processor-readable storage medium of claim 15, wherein a plurality of data packages is transferred in parallel using respective independent sets of transfer threads.

20. The non-transitory processor-readable storage medium of claim 15, wherein the transferring of the assigned largest data file on the particular assigned transfer thread continues until the transfer of the assigned largest data file completes.

* * * * *